(12) United States Patent
Ji et al.

(10) Patent No.: US 11,518,106 B2
(45) Date of Patent: Dec. 6, 2022

(54) STRAIN SENSOR, 3D PRINTING HEAD ASSEMBLY AND 3D PRINTER

(71) Applicant: Shenzhen Creality 3D Technology Co., Ltd., Guangdong (CN)

(72) Inventors: Guoliang Ji, Guangdong (CN); Huilin Liu, Guangdong (CN); Chun Chen, Guangdong (CN); Jingke Tang, Guangdong (CN); Danjun Ao, Guangdong (CN)

(73) Assignee: Shenzhen Creality 3D Technology Co., Ltd., Shenzhen (CN)

( * ) Notice: Subject to any disclaimer, the term of this patent is extended or adjusted under 35 U.S.C. 154(b) by 208 days.

(21) Appl. No.: 16/846,607

(22) Filed: Apr. 13, 2020

(65) Prior Publication Data

US 2021/0206116 A1 Jul. 8, 2021

(30) Foreign Application Priority Data

Jan. 3, 2020 (CN) .......................... 202010005281.5

(51) Int. Cl.
| | |
|---|---|
| *B29C 64/393* | (2017.01) |
| *B33Y 30/00* | (2015.01) |
| *B33Y 50/02* | (2015.01) |
| *B29C 64/209* | (2017.01) |
| *G01L 1/22* | (2006.01) |

(52) U.S. Cl.
CPC .......... *B29C 64/393* (2017.08); *B29C 64/209* (2017.08); *B33Y 30/00* (2014.12); *B33Y 50/02* (2014.12); *G01L 1/2206* (2013.01)

(58) Field of Classification Search
None
See application file for complete search history.

(56) References Cited

U.S. PATENT DOCUMENTS

| 4,596,155 A | * | 6/1986 | Kistler | ...................... G01B 7/18 |
| | | | | 73/781 |
| 2007/0004207 A1 | * | 1/2007 | Legat | .................. B81C 1/00158 |
| | | | | 438/689 |
| 2014/0328963 A1 | * | 11/2014 | Mark | ..................... B29C 64/209 |
| | | | | 425/143 |
| 2016/0185042 A1 | * | 6/2016 | Toh | ........................ B29C 64/209 |
| | | | | 425/132 |
| 2019/0257704 A1 | * | 8/2019 | Steyn | ......................... G01L 1/22 |

FOREIGN PATENT DOCUMENTS

| CN | 108481741 | * | 2/2018 | ............. B33Y 10/00 |
| WO | WO-9730332 A1 | * | 8/1997 | ............. B65H 59/40 |
| WO | WO-2019183240 A1 | * | 9/2019 | ........... B29C 64/118 |

* cited by examiner

*Primary Examiner* — Joseph S Del Sole
*Assistant Examiner* — Guy F Mongelli
(74) *Attorney, Agent, or Firm* — ScienBiziP, P.C.

(57) ABSTRACT

Provided is a strain sensor including a fixing plate and a strain gauge. The fixing plate includes a first supporting part and a second supporting part flexibly connected to the first supporting part. The present application is advantageous in that a strain sensor with a simple structure, high reliability and high sensitivity is provided. The horizontal status of a contact surface may be detected by a little amount of deformation, and the flexible fixing plate can provide a buffer for the equipment to prevent damages due to direct impact.

7 Claims, 3 Drawing Sheets

STRAIN SENSOR, 3D PRINTING HEAD ASSEMBLY AND 3D PRINTER

CROSS REFERENCE TO RELATED APPLICATIONS

The present application is based on Chinese Patent Application No. 202010005281.5 filed on Jan. 3, 2020 and claims its priority. The entire disclosure of the application is hereby incorporated by reference in its entirety.

TECHNICAL FIELD

The present application relates to a 3D printing apparatus, in particular to a strain sensor, a 3D printing head assembly and a 3D printer.

BACKGROUND 3D printers construct objects by printing layer by layer, and are mainly based on inverted printing. Therefore, when printing an object, the plane of the first layer must maintain horizontal. If the plane is not horizontal, a leveling process is carried out by recording the distance between the printing head and the plane to compensate the difference.

Existing leveling methods using an actuator may include micro switches installed on the actuator. The micro switches are put down before leveling, and stowed thereafter. However, because there is a certain distance between the installation position of the actuator and the nozzle, errors may exist in the measured values, and subsequent manual correction to the errors is complicated.

Therefore, improvement is needed for the prior art.

SUMMARY

An objective of the present application is to provide a printing assembly with simple structure, novel design, and is easy to operate with leveling function.

To achieve the above objective, an embodiment adopted by the present application is: a strain sensor including a fixing plate and a strain gauge, the fixing plate includes a first supporting part and a second supporting part flexibly connected to the first supporting part, and the strain gauge is provided on the second supporting part.

Further, a cutout portion is provided on the fixing plate, the second supporting part is provided in the cutout portion, and an end of the second supporting part is connected to an end of the cutout portion.

Further, the first supporting part and the second supporting part are perpendicular to each other.

Further, the fixing plate is made of metal.

Further, the fixing plate is a spring steel plate.

Further, the strain gauge is connected to the second supporting part by adhesion or welding.

The present application also relates to a 3D printing head assembly, including the strain sensor according to any one of the above and a printing head fixedly connected to the second supporting part.

Further, the second supporting part is provided with two mounting holes, and a positioning notch is provided between the two mounting holes.

Further, the printing head includes a connecting pipe, a nozzle, a heating block, a heat dissipating block and a fan. A lower end of the connecting pipe is connected to an upper end of the nozzle, and the heating block is sleeved on the nozzle. The heat dissipating block is sleeved on the connecting pipe, and the fan is fixed to the heat dissipating block.

The present application further relates to a 3D printer. The 3D printer includes the 3D printing head assembly according to any one of the above. The 3D printer further includes a back plate of a moving device and a control circuit board. The 3D printing head assembly is connected to the back plate of the moving device through the first supporting part. The back plate of the moving device is provided with at least three pulley mounting positions, each of which is mounted with a pulley. The control circuit board is connected to the strain gauge of the 3D printing head assembly.

The advantageous effect of the application is that a strain sensor with a simple structure, high reliability and high sensitivity is provided. The horizontal status of a contact surface may be obtained through a little amount of deformation. The fixing plate that is flexible may provide a buffer for the equipment to prevent damages due to direct impact. By connecting the printing head to the printer through the strain sensor, the levelness between a printing platform and the printing head may be detected according to deformation of the strain sensor, and automatic leveling may be achieved by controlling the distance between the printing head and the printing platform.

BRIEF DESCRIPTION OF THE DRAWINGS

The specific structure of the present application is described in detail hereinafter in conjunction with the accompanying drawings.

10 fixing plate, 11 first supporting part, 12 second supporting part, 13 strain gauge, 14 positioning notch, 21 connecting pipe, 22 nozzle, 23 heating block, 24 heat dissipating block, 25 fan, 26 air guiding cover, 31 quick connector, 32 connecting snap, 41 back plate of a moving device, 42 pulley.

DESCRIPTION OF THE EMBODIMENTS

The technical content, structural features, objectives achieved and effects of the present application are explained in detail in conjunction with embodiments referring to the accompanying drawings.

Embodiment 1

Figure 1:
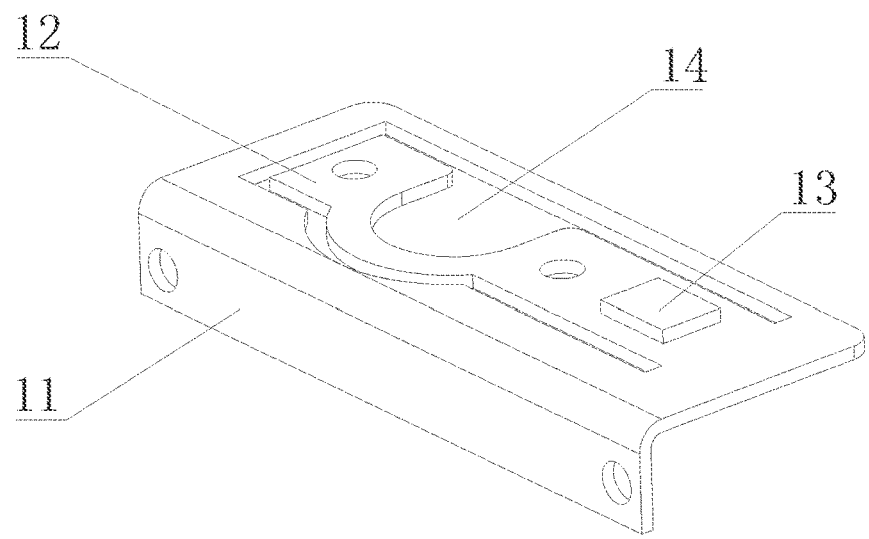
FIG. 1 is a schematic diagram of an overall structure of a strain sensor of the present application.

Referring to FIG. 1, a strain sensor includes a fixing plate 10 and a strain gauge 13. The fixing plate 10 includes a first supporting part 11 and a second supporting part 12. The first supporting part 11 and the second supporting part 12 are perpendicular and flexibly connected to each other. Specifically, a cutout portion is provided on the fixing plate 10, and the second supporting part 12 is disposed in the cutout portion with one end connected to an end of the cutout portion. For ease of connection, the first supporting part 11 is provided with two fixing holes, and the second supporting part 12 is provided with two mounting holes.

The second supporting part 12 is provided with a strain gauge 13 near the side connected to the fixing plate 10. Specifically, the strain gauge 13 is connected to the second supporting part 12 by adhesion or welding. The strain gauge 13 is a resistance strain gauge.

The fixing plate 10 is made of metal. Preferably, the fixing plate 10 is a spring steel plate. A metal fixing plate may reliably fix a printing head, and at the same time, be capable of flexible deformation, so that the strain gauge may be deformed together.

In order to further increase the structural strength of the fixing plate, the first supporting part and the second supporting part are formed into an integrated structure.

According to the above description, the advantageous effect of the application is that a strain sensor with a simple structure, high reliability and high sensitivity is provided. The horizontal status of a contact surface may be obtained through a little amount of deformation, and the flexible fixing plate may provide a buffer for the equipment to prevent damages due to direct impact.

Embodiment 2

Figure 2:
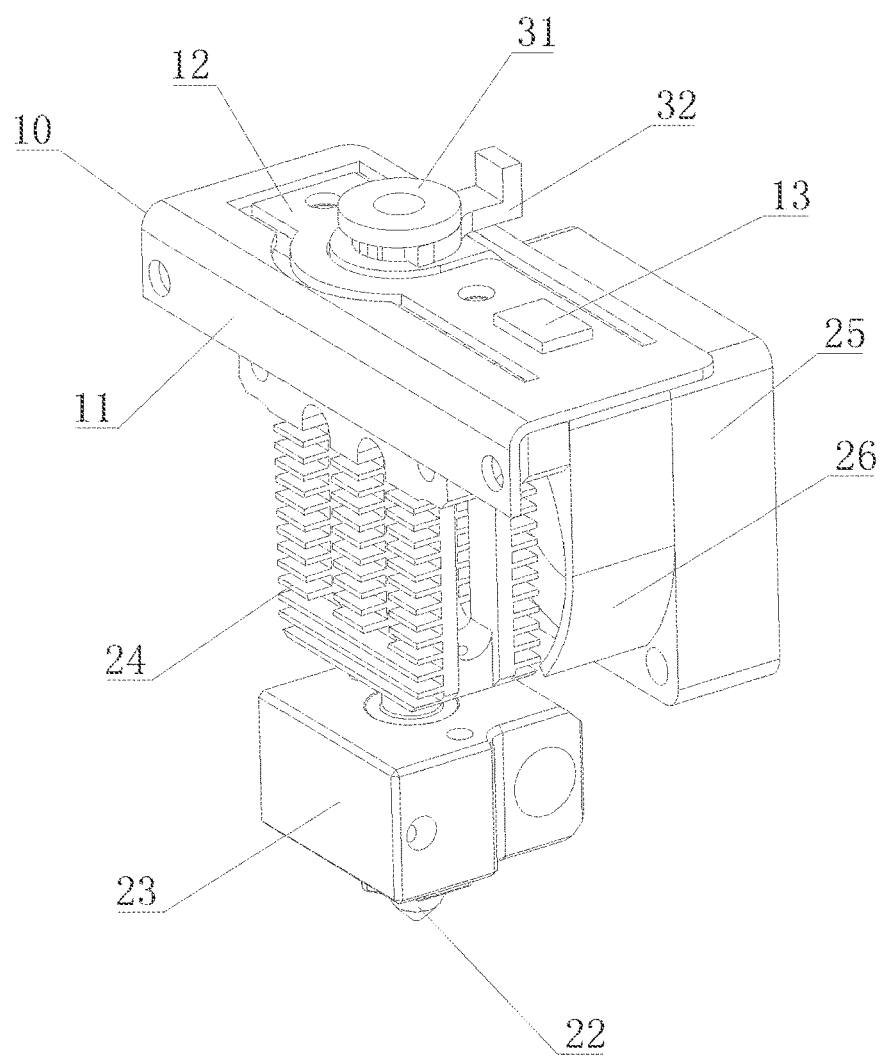
FIG. 2 is a schematic diagram of an overall structure of a 3D printing head assembly of the present application.
Figure 3:
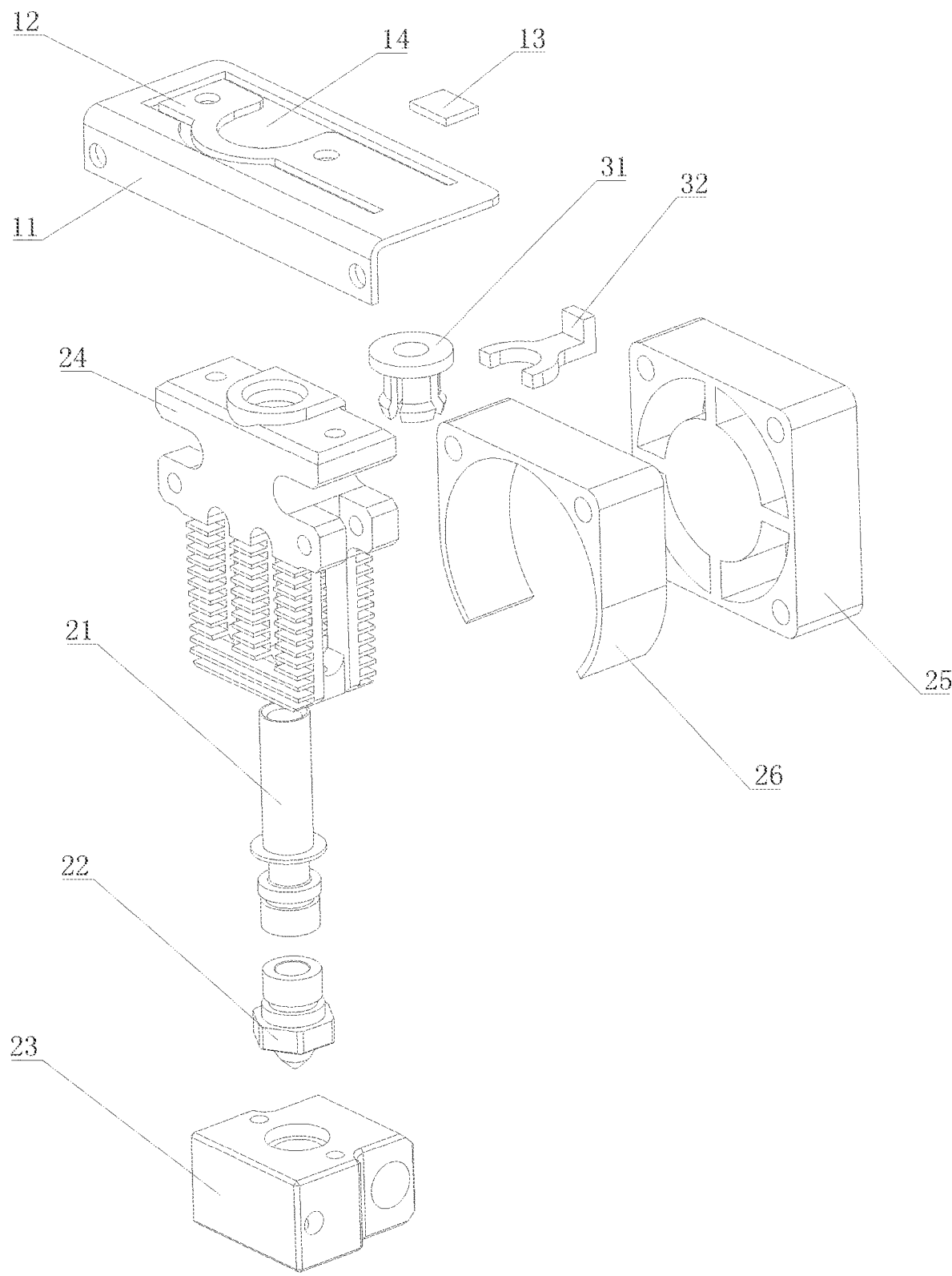
FIG. 3 is a schematic diagram of an exploded structure of the 3D printing head assembly of the present application.

Referring to FIG. 2 and FIG. 3, the present application further relates to a 3D printing head assembly, which includes the above-mentioned strain sensor and a printing head. The second supporting part 12 of the strain sensor is fixedly connected to the printing head through mounting holes. In order to avoid the second supporting part from blocking the transport of printing material to the printing head, as well as to facilitate the mounting of the printing head to the second supporting part, a positioning notch 14 is also provided between the two mounting holes of the second supporting part.

During the printing process, if the printing head contacts the printing platform, an external force will be exerted by the printing platform. The external force is transferred to the second supporting part through the printing head, thereby causing deformation between the second supporting part and the fixing plate. This then affects the strain gauge and makes the strain gauge to deform, and the resistance of the strain gauge changes accordingly. The external force exerted on the printing head is confirmed when the change in resistance is converted into the change in voltage by a control circuit. That is, when the printing platform exerts a force on the printing head, the main control chip can detect the voltage change of the resistance strain gauge. Meanwhile, the printer controls the printing head to move away from the printing platform, thereby achieving automatic leveling.

The fixing plate made of metal may reliably fix the printing head, and at the same time, it is capable of flexible deformation to provide a buffer for the printing head and prevent the printing head from damages due to direct impact.

The printing head includes a connecting pipe 21, a nozzle 22, a heating block 23, a heat dissipating block 24, and a fan 25. A lower end of the connecting pipe 21 is connected to an upper end of the nozzle 22, and the heating block 23 is sleeved on the nozzle 22. The heat dissipating block 24 is sleeved on the connecting pipe 21, and the fan 25 is fixed to the heat dissipating block 24.

The heat dissipating block provided on an outside of the connecting pipe may prevent the heat generated by the heating block from being transmitted to an upper part of the connecting pipe, which may cause the printing consumables to melt early and thus block the connecting pipe. The installation of the fan may further enhance the heat dissipation capacity of the heat dissipating block. In order to guide the wind from the fan to blow evenly to the heat dissipating block, an air guiding cover 26 is further provided between the heat dissipating block and the fan.

In order to ease the input of the printing material into the connecting pipe, the printing head further includes a quick connector 31 and a connecting snap 32. One end of the quick connector 31 is connected to a feeding pipe, and the other end thereof is connected to a connecting hole at the top of the heat dissipating block. The one end of the quick connector 31 connected to the connecting hole is provided with at least two claws with a gap between two adjacent claws, and a fixing protrusion is provided on an outer edge of the claw. An inner wall of the connecting hole is provided with a fixing groove corresponding to the fixing protrusions. Since there is still a gap for the quick connector to move after the quick connector is inserted into the connecting hole, the connecting snap is clamped between the quick connector and the heat dissipating block. It may prevent the relative displacement between the quick connector and the connection pipe.

According to the above description, the advantageous effect of the present application is that a 3D printing head assembly with a small size, a simple structure, convenient installation, and low cost is provided. A printer using the 3D printing head assembly can automatically adjust the distance between the 3D printing head assembly and the printing plane by detecting the deformation of a fixing plate through a strain gauge, thereby achieving automatic leveling.

Embodiment 3

Figure 4:
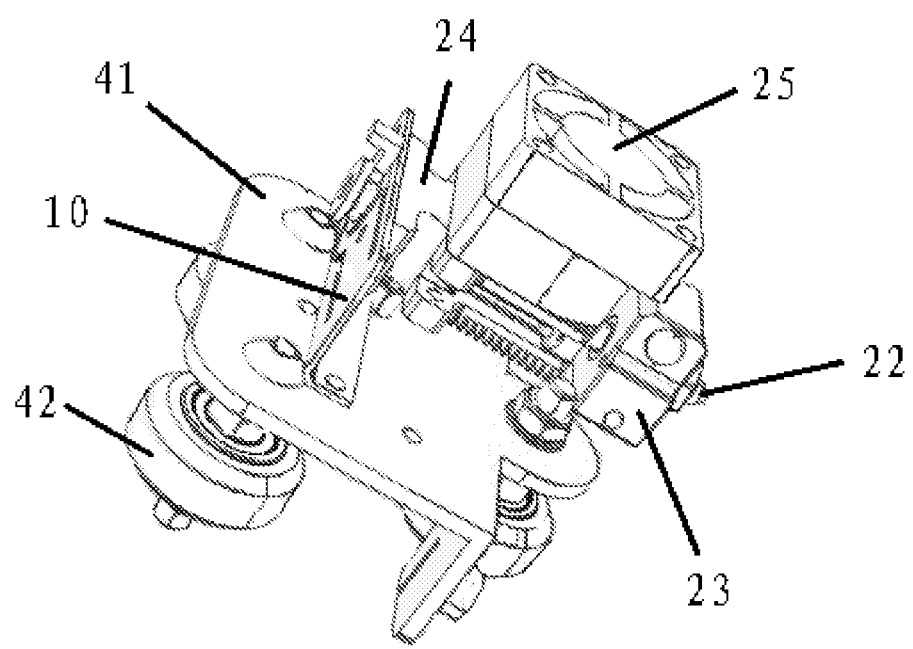
FIG. 4 is a schematic diagram of a structure of a 3D printing head assembly and a back plate of a moving device of the present application.

Referring to FIG. 4, the present application further relates to a 3D printer, which includes the aforementioned 3D printing head assembly. The 3D printer further includes a back plate of a moving device 41 and a control circuit board. The 3D printing head assembly is connected to the back plate of the moving device through the first supporting part. The back plate of the moving device is provided with at least three pulley mounting positions, and each pulley mounting position is arranged with a pulley 42. The control circuit board is connected to a strain gauge of the 3D printing head assembly.

In the present embodiment, the 3D printer has a gantry frame structure. The gantry frame can move in a reciprocating action back and forth along the X-axis of the printing platform. The gantry frame is provided with a cross rail. The 3D printing head assembly can move in a reciprocating action leftward and rightward along the Y-axis on the cross rail of the gantry frame through the pulleys, and the cross rail can move in a reciprocating action up and down in the Z-axis direction of the frame. The X-axis and Y-axis are in the horizontal direction, and the Z-axis is in the vertical direction, and the X-axis, the Y-axis and the Z-axis are perpendicular to each other.

By applying the 3D printing head assembly described above, since a spring steel plate and a strain gauge are used in the leveling structure, the advantages of small size, easy installation and low cost may be achieved. The structure of the spring steel plate in coordination with the strain gauge does not occupy the space of the nozzle and has a good detection effect, and it does not require the manual leveling operation. Therefore, it enables the 3D printer to conduct a finer and more stable printing operation and enhances the success rate of printing, without lowering the printer performance.

In addition, in order to improve the sensitivity of the strain gauge, the strain gauge is connected to the control circuit board via a full-bridge circuit.

In the above, up, down, left, right, front, and back only represent their relative positions and not their absolute positions.

The above mentioned are only embodiments of the present application, and are not intended to limit the scope of patent protection of the present application. Any equivalent structures or equivalent process transformation utilizing the present specification and drawings, or applied directly or indirectly to other related art shall fall within the scope of protection of the present application.

What is claimed is:

1. A 3D printing head assembly, comprising:
a strain sensor, comprises a fixing plate and a strain gauge, wherein the fixing plate comprises a first supporting part and a second supporting part flexibly connected to the first supporting part, the strain gauge is provided on the second supporting part; the fixing plate is provided with a cutout portion, the second supporting part is provided in the cutout portion, and one end of the second supporting part is connected to an end of the cutout portion; and the second supporting part is provided with two mounting holes and a positioning notch for fixing a printing head, the positioning notch is provided between the two mounting holes; an opening of the positioning notch is defined at a side of the second supporting part, the positioning notch is communicated with the cutout portion; and
a printing head fixedly connected to the second supporting part;
wherein the printing head comprises a connecting pipe, a nozzle, a heating block, a heat dissipating block and a fan, a lower end of the connecting pipe is connected to an upper end of the nozzle, and the heating block is sleeved on the nozzle, the heat dissipating block is sleeved on the connecting pipe, and the fan is fixed to the heat dissipating block; part of the heat dissipating block is positioned in the positioning notch;
wherein the printing head comprises a quick connector and a connecting snap, an end of the quick connector is connected to a connecting hole at the top of the heat dissipating block, the end of the quick connector connected to the connecting hole is provided with at least two claws with a gap between two adjacent claws, and a fixing protrusion is provided on an outer edge of the claw, an inner wall of the connecting hole is provided with a fixing groove corresponding to the fixing protrusions, the connecting snap is clamped between the quick connector and the heat dissipating block, and the connecting snap abuts a side of the fixing plate away from the first supporting part.

2. A 3D printing head assembly, comprising:
a strain sensor, comprises a fixing plate and a strain gauge, wherein the fixing plate comprises a first supporting part and a second supporting part flexibly connected to the first supporting part, the strain gauge is provided on the second supporting part; the fixing plate is provided with a cutout portion, the second supporting part is provided in the cutout portion, and one end of the second supporting part is connected to an end of the cutout portion; and the second supporting part is provided with two mounting holes and a positioning notch for fixing a printing head, the positioning notch is provided between the two mounting holes; an opening of the positioning notch is defined at a side of the second supporting part, the positioning notch is communicated with the cutout portion; wherein the first supporting part is perpendicular to the second supporting part; and
a printing head fixedly connected to the second supporting part;
wherein the printing head comprises a connecting pipe, a nozzle, a heating block, a heat dissipating block and a fan, a lower end of the connecting pipe is connected to an upper end of the nozzle, and the heating block is sleeved on the nozzle, the heat dissipating block is sleeved on the connecting pipe, and the fan is fixed to the heat dissipating block; part of the heat dissipating block is positioned in the positioning notch;
wherein the printing head comprises a quick connector and a connecting snap, an end of the quick connector is connected to a connecting hole at the top of the heat dissipating block, the end of the quick connector connected to the connecting hole is provided with at least two claws with a gap between two adjacent claws, and a fixing protrusion is provided on an outer edge of the claw, an inner wall of the connecting hole is provided with a fixing groove corresponding to the fixing protrusions, the connecting snap is clamped between the quick connector and the heat dissipating block, and the connecting snap abuts a side of the fixing plate away from the first supporting part.

3. A 3D printer, comprising the 3D printing head assembly according to claim 1, wherein the 3D printer further comprises a back plate and a control circuit board, the 3D printing head assembly is connected to the back plate through the first supporting part, the back plate is provided with at least three pulley mounting positions, each of the pulley mounting positions is mounted with a pulley, the control circuit board is connected to the strain gauge of the 3D printing head assembly.

4. A 3D printer, comprising the 3D printing head assembly according to claim 1, wherein the 3D printer further comprises a back plate and a control circuit board, the 3D printing head assembly is connected to the back plate through the first supporting part, the back plate is provided with at least three pulley mounting positions, each of the pulley mounting positions is mounted with a pulley, the control circuit board is connected to the strain gauge of the 3D printing head assembly.

5. The 3D printer according of claim 4, wherein the printing head comprises a quick connector and a connecting snap, an end of the quick connector is connected to a connecting hole at the top of the heat dissipating block, the end of the quick connector connected to the connecting hole is provided with at least two claws with a gap between two adjacent claws, and a fixing protrusion is provided on an outer edge of the claw, an inner wall of the connecting hole is provided with a fixing groove corresponding to the fixing protrusions, the connecting snap is clamped between the quick connector and the heat dissipating block, and the connecting snap abuts a side of the fixing plate away from the first supporting part.

6. The 3D printer according to claim 3, wherein the first supporting part is provided with two fixing holes; the back plate is connected to a side wall of the first supporting part, the side wall of the first supporting part is adjacent to the second supporting part.

7. The 3D printer according to claim 4, wherein the first supporting part is provided with two fixing holes; the back plate is connected to a side wall of the first supporting part, the side wall of the first supporting part is adjacent to the second supporting part.

\* \* \* \* \*